(12) United States Patent
Johnson

(10) Patent No.: US 9,034,081 B2
(45) Date of Patent: May 19, 2015

(54) DOWN-FLOW DIRECT CONTACT COOLER

(75) Inventor: Dennis W. Johnson, Simpsonville, SC (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 136 days.

(21) Appl. No.: 13/302,248

(22) Filed: Nov. 22, 2011

(65) Prior Publication Data

US 2013/0125752 A1    May 23, 2013

(51) Int. Cl.
*B01D 8/00* (2006.01)
*B01D 5/00* (2006.01)
*B01D 53/14* (2006.01)
*B01D 53/00* (2006.01)

(52) U.S. Cl.
CPC .............. *B01D 8/00* (2013.01); *B01D 53/1431* (2013.01); *B01D 53/002* (2013.01); *B01D 5/003* (2013.01)

(58) Field of Classification Search
CPC combination set(s) only.
See application file for complete search history.

(56) References Cited

U.S. PATENT DOCUMENTS

| | | | |
|---|---|---|---|
| 2,598,116 A * | 5/1952 | Du Bois | 95/199 |
| 2,715,948 A | 8/1955 | Lewis et al. | |
| 3,121,127 A * | 2/1964 | Hedin | 261/22 |
| 3,950,493 A | 4/1976 | Dorr et al. | |
| 4,073,634 A | 2/1978 | Pircon et al. | |
| 4,168,150 A | 9/1979 | Pircon et al. | |
| 4,252,553 A | 2/1981 | Pircon et al. | |
| 4,539,816 A * | 9/1985 | Fox | 62/87 |
| 4,562,053 A * | 12/1985 | Andersson | 423/235 |
| 5,707,426 A * | 1/1998 | Kalka et al. | 95/200 |
| 2003/0059352 A1 | 3/2003 | Karras et al. | |
| 2009/0188782 A1* | 7/2009 | Genuario et al. | 204/157.3 |
| 2010/0040524 A1* | 2/2010 | Furnary et al. | 423/235 |
| 2010/0074828 A1* | 3/2010 | Singh | 423/432 |
| 2010/0158773 A1* | 6/2010 | Schwab | 423/210 |
| 2010/0284899 A1* | 11/2010 | Kita et al. | 423/522 |
| 2011/0120308 A1 | 5/2011 | Dube et al. | |
| 2011/0303135 A1* | 12/2011 | Birmingham et al. | 110/341 |

OTHER PUBLICATIONS

Beychok, Milton, Fossil fule combustion flue gases, Environmental Information Coalition, National Council for Science and the Environment, Encyclopedia of Earth, Nov. 8, 2011, retrieved online.*
The Encyclopedia of Earth.*
"Direct Contact Condensers", A.H. Lundber, Inc., http://www.ahlundberginc.com/direct_contact_condensers.htm.
(Continued)

*Primary Examiner* — Duane Smith
*Assistant Examiner* — Cabrena Holecek
(74) *Attorney, Agent, or Firm* — Fish & Tsang, LLP

(57) ABSTRACT

Systems and methods are contemplated for down-flow cooling of a feed gas. Contemplated systems can include a housing having an inlet conduit disposed within an upper portion and configured to receive a first stream. First and second stages can be disposed within the housing, with the first stage disposed upstream of the second stage and having a first cooling stream, and the second stage having a second cooling stream that is colder than the first cooling stream. The housing can be configured such that the first stream is cooled by down-flow heat exchange with the first and second cooling streams to produce a conditioned stream depleted of at least a portion of water condensed from the feed gas.

28 Claims, 3 Drawing Sheets

(56) References Cited

OTHER PUBLICATIONS

Bharathan, D., et al., "Direct-Contact Condensers for Open-Cycle OTEC Applications—Model Validation with Fresh Water Experiments for Structured Packings", Solar Energy Research Institute, Oct. 1988.

Patent Cooperation Treaty, "Notification of Transmittal of the International Search Report and the Written Opinion of the International Searching Authority, of the Declaration", PCT Application No. PCT/US12/66030, issued Mar. 29, 2013.

* cited by examiner

DOWN-FLOW DIRECT CONTACT COOLER

FIELD OF THE INVENTION

The field of the invention is gas conditioning systems.

BACKGROUND

In direct contact coolers (DCCs) such as the Econamine FG Plus$^{SM}$ plant at Bellingham, Mass. and those described in U.S. Pat. No. 2,715,948 to Lewis, et al., a gas typically enters a side of the DCC vessel, turns 90 degrees, passes through irrigated packing, and exits through a top of the DCC vessel. When a DCC is coupled downstream of another gas cleaning system such as a flue gas desulfurization (FGD) system (see FIG. 1), complex ductwork arrangement is typically required because the product gas exits the top of the FGD and is then directed to the bottom of an adjacent DCC where the gas then flows to the top of the DCC and back down to the ground into a blower or booster fan.

Although down-flow DCCs are discussed in U.S. Pat. Nos. 4,073,634, 4,168,150, and 4,252,553 to Pircon, et al., such coolers are (1) impractical because of the impact of flue gas impurities such as $SO_2$ and other acid gases on the coolers and downstream components, and (2) inefficient because of the co-current heat exchange. Pircon and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved gas conditioning systems and methods configured for down-flow of a feed gas that eliminate one or more of the problems discussed above.

SUMMARY OF THE INVENTION

The inventive subject matter provides apparatus, systems and methods in which a gas conditioning system can be configured for down-flow of a feed gas. As used herein, the term "down-flow" means a generally downward flow in a direction that is generally concurrent with respect to a gravity flow, and upward flow would be in a direction that is generally countercurrent with respect to a gravity flow. For example, under this definition, the DCC in FIG. 1 would be considered to be configured for upward flow of a feed gas.

It is contemplated that the inventive subject matter could be applied to processes utilizing a DCC or other commercially suitable gas conditioning system for flue gas conditioning after a FGD system or other commercially suitable scrubbing system including, for example, systems having coal- or oil-fired power plants. Thus, the inventive subject matter could apply to virtually all post-combustion $CO_2$ processes whether commercially available or not yet developed.

Exemplary gas conditioning systems can include a housing having an inlet conduit disposed within an upper portion of the housing and configured to receive a first stream. The housing can further include a first stage having a first cooling stream, and a second stage disposed downstream of the first stage with a second cooling stream that is colder at an inlet temperature than an inlet temperature of the first cooling stream. The inlet temperature ($T_0$) of each of the first and second cooling streams is defined as the temperature of each stream when the stream enters the respective stages of the housing. As used herein, the term "stage" means a section of a housing or vessel separated from one or more adjacent sections by a fluid collector or other separation device.

Preferably, the second cooling stream has an inlet temperature that is at least 20° C. colder than an inlet temperature of the first cooling stream, and more preferably, has an inlet temperature that is at least 40° C., 60° C., 80° C., or more colder with respect to an inlet temperature of the first cooling stream. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In preferred embodiments, the housing can be configured such that the first stream is cooled by down-flow heat exchange with the first and second cooling streams to produce a cooled stream depleted of at least a portion of water condensed from the feed gas or first stream.

In one aspect, methods of down-flow cooling of a feed gas are contemplated that include receiving a first stream in an upper portion of a vessel. At least a portion of the first stream can be subsequently cooled by down-flow heat exchange with a first cooling and a second cooling fluid to produce a cooled stream depleted of at least a portion of water condensed from the feed gas or first stream. In such embodiments, it is preferred that the second cooling stream be colder than the first cooling stream.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including the elimination of costly ductwork, which reduces the cost, space required, and pressure drop of the system. The inventive subject matter discussed herein could be applied to almost all post-combustion $CO_2$ capture processes including, but not limited to, processes that are both commercially-available or under current or future development. This could include, for example, applications in power, pulp and paper, mining, refining, steel and other industries.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
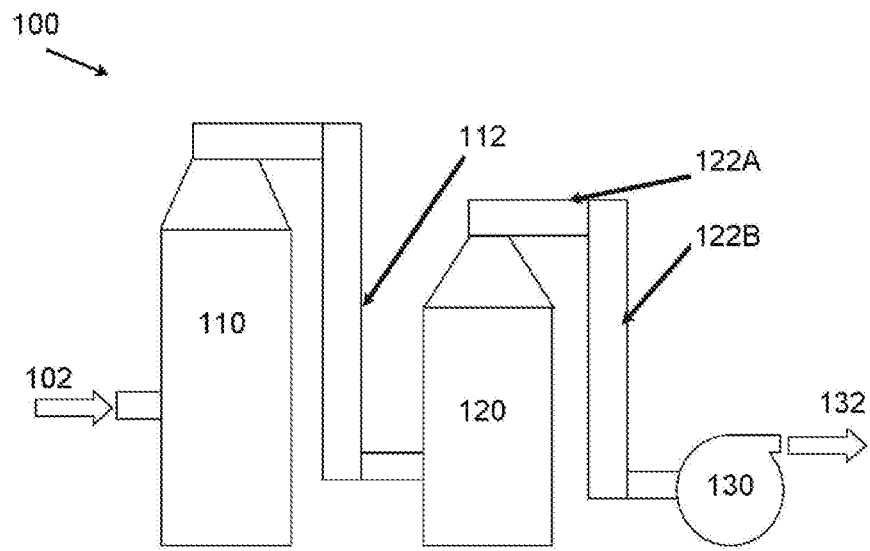
FIG. 1 is a schematic of a prior art gas conditioning system having a direct contact cooler configured for upward flow of a feed gas.

In FIG. 1, a prior art flue gas cleaning system 100 is shown having a FGD 110 fluidly coupled to a DCC 120 configured for upward flow of a feed gas 102. The feed gas 102 enters the side of the FGD 110 and a product gas can be exhausted from the top of the FGD 110 and into ductwork 112. From the ductwork 112, the product gas enters a lower portion of DCC 120, which produces a cooled stream. The cooled stream then exits the top of DCC 120 and flows downwardly through ductwork 122A and 122B to blower 130 where it exits as stream 132. Thus, in such configurations, complex ductwork arrangements (ductwork 112, 122A, and 122B) are needed to move the gas through system 100, which increases the cost, pressure drop, and required space of the system 100.

Figure 2:
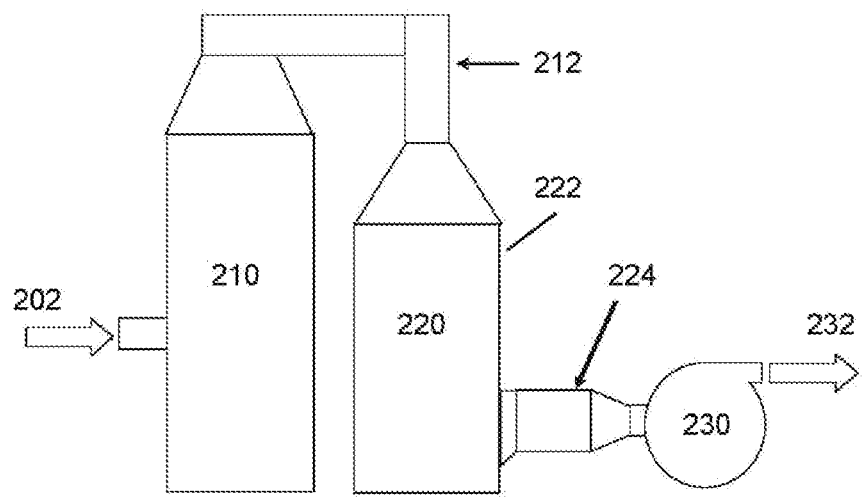
FIG. 2 is a schematic of one embodiment of a gas conditioning system configured for down-flow of a feed gas.

In contrast, FIG. 2 illustrates one embodiment of a gas conditioning system 220 configured for down-flow of a feed gas. In preferred embodiments, system 220 can include a housing 222 having an inlet conduit 212 disposed within an upper portion of the housing 222 and configured to receive a first stream. It is especially preferred that the gas conditioning system 220 comprises a DCC, although any commercially suitable conditioning system could be used.

The first stream, and one or more cooling streams, can flow in a direction that is concurrent with respect to one another to thereby cool the first stream by down-flow heat exchange with respect to the one or more cooling streams. In this manner, the first stream, and one or more cooling streams, can flow from the upper portion of system 220 to a lower portion of system 220. It is contemplated that both the first stream and the one or more cooling streams can reach an approximate equilibrium in temperature at a lower portion of system 220 as the gas cools and the moisture condenses.

In some contemplated embodiments, the gas conditioning system 220 can be coupled to an upstream acid gas removal system 210, which preferably comprises a FGD unit configured to remove $SO_x$ from a flue gas 202 and produce the first stream that is substantially depleted of $SO_x$. As used herein, the term "substantially depleted" means less than 10%. For example, substantially depleted of $SO_x$ means less than 10% of $SO_x$ in the inlet gas remains prior to entering the gas conditioning system. In some embodiments, depending upon the specific application, it is preferred that less than 1% of the inlet $SO_x$ remains or substantially all of the $SO_x$ remains.

The first stream can then flow from the acid gas removal system 210 through the inlet conduit 212 and into gas conditioning system 220. Alternatively, it is contemplated that the acid gas removal system 210 could be replaced by any commercially suitable scrubbing systems including, for example, caustic scrubbers and chloride scrubbers.

System 220 can produce a conditioned stream 232 that can be fed into a mist eliminator 224 prior to flowing through fan or blower 230, which can thereby prevent water carryover into fan 230 and other downstream equipment. Thus, by utilizing the down-flow gas conditioning system 220 in place of the up-flow DCC of FIG. 1, a significant savings in otherwise expensive ductwork, structural supports, foundations, engineering, access provisions, and expansion joints can be achieved, the required space of the system 220 can be reduced, and a notable reduction in pressure drop can be achieved. The lower pressure drop results in less energy consumption of blower 230.

It is contemplated that the housing 222 may include two or more stages, each of which can include an injection point for a cooling fluid to meet the necessary cooling requirements for the specific application.

Figures 3A, 3B:
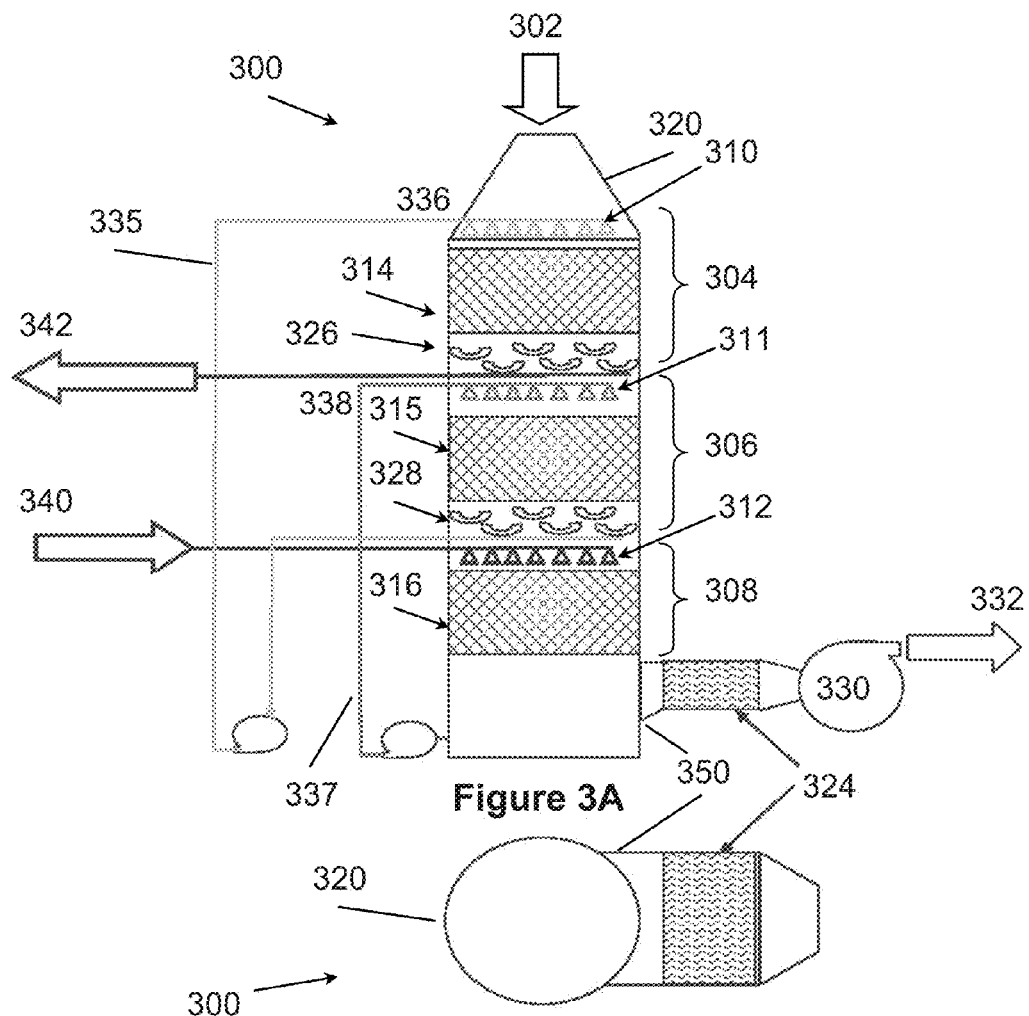
FIGS. 3A-3B are side-view and top-view schematics, respectively, of another embodiment of a gas conditioning system.

In FIGS. 3A-3B, another embodiment of a gas conditioning system 300 is shown having a housing 320 configured to receive a first stream 302. The housing 320 include first, second and third stages 304, 306, and 308, respectively, but could alternatively include a single stage, two stages, or four or more stages. Preferably, the coldest liquid and/or gas streams are at the lower portion of the housing 320 to effect a more efficient heat transfer. Each of the stages 304, 306, and 308 can include a liquid distributor 310-312, and packing 314-316, respectively. In addition, each of the first and second stages 304 and 306 can include first and second liquid collectors 326 and 328, respectively, which are configured to collect at least a portion of the spent first and second cooling streams 336 and 338.

Contemplated liquid distributors could include, for example, sprays, weirs, pipes, and any other commercially suitable distributors and combinations thereof. Contemplated liquid collectors could include, for example, chimney and other trays, channels, troughs, and other commercially suitable gas/liquid separators and combinations thereof.

As shown in FIG. 3A, the first stage 304 can be disposed upstream of the second stage 306, and in an upper portion of the housing 320, such that the first stream 302 passes through the first stage 304 before reaching the second stage 306. First cooling stream 336 can be distributed within the first stage 304 via liquid distributor 310, and second cooling stream 338 can be distributed within the second stage 306 via liquid distributor 311. In especially preferred embodiments, the second cooling stream 338 can have an inlet temperature that is less than an inlet temperature of the first cooling stream 336. Similarly, a third cooling stream 340 can be distributed via liquid distributor 312 within the third stage 308, which is disposed within a lower or bottom portion of housing 320. The third cooling stream 340 preferably has an inlet temperature that is less than the inlet temperatures of both the first and second cooling streams 336 and 338, respectively.

Thus, as the first stream 302 flows in a down-flow manner within system 300, the first stream 302 can be cooled by down-flow heat exchange with each of the first, second, and third cooling streams 336, 338, 340, respectively, to produce a conditioned stream 332 depleted of at least a portion of liquid condensed from the first stream 302, and that preferably exits a lower portion of housing 320 via outlet conduit 350. Furthermore, the liquid condensed from the first stream 302 collected within system 300 can be discharged from system 300 through heated stream 342, as a purge stream from cooling conduits 335 or 337, or as an overflow from lower portion of the housing 320 to control accumulation.

Each of the first and second stages 304 and 306 can include respective first and second cooling circuits 335 and 337, in which the first and second cooling fluids 336 and 338 can be directed from housing 320 through an optional pump to liquid distributors 310 and 311.

In some contemplated embodiments, the first cooling stream 336 can be drawn from liquid collectors 328 disposed in the second stage 306, and the first cooling stream 336 will thereby include at least a portion of the spent second cooling stream 338. As the first cooling stream 336 flows downwardly within the first stage 304, at least a portion of the first cooling stream 336 can be collected by liquid collectors 326 and be bled from system 300 as heated stream 342. Either or both of the liquid collectors 326 and 328 can function as separation devices disposed between the adjacent stages. It is contemplated that at least a portion of the heated stream 342 could be cooled through one or more exchangers and reintroduced to housing 320 as the third cooling stream 340, or could be directed elsewhere. The second cooling stream 338 can be drawn from the collector tank at a bottom portion of system 300. It is also contemplated that at least a portion of second cooling stream 338 could be cooled through one or more exchangers and reintroduced to housing 320 as the third cooling stream 340, or could be directed elsewhere.

It is contemplated that system 300 can be fluidly coupled to a downstream absorber (not shown) configured to receive at least a portion of the conditioned stream 332. Preferably, the downstream absorber comprises a $CO_2$ capture system configured to produce a third stream that is substantially depleted of $CO_2$, although any commercially suitable absorber could be used.

The outlet conduit 350 can include a mist eliminator 324 configured to prevent water carryover into fan 330 and other downstream equipment.

Figure 4:
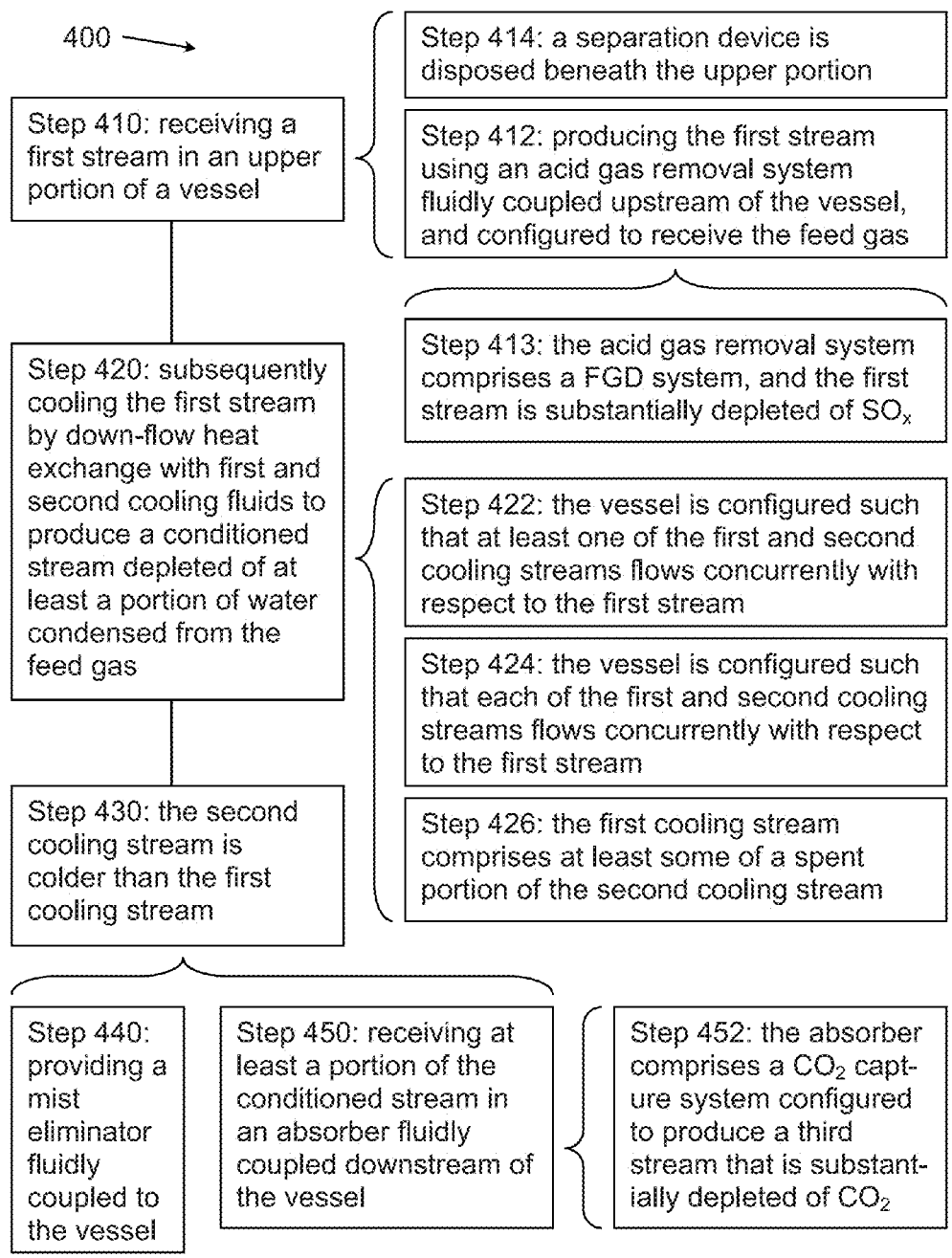
FIG. 4 is a flowchart of one embodiment of a method of down-flow cooling of a feed gas.

FIG. 4 illustrates one embodiment of a method 400 of down-flow cooling of a feed gas, which includes receiving a first stream in an upper portion of a vessel in step 410. The vessel can include a separation device in step 414, such that upper and lower portions of the vessel can be separated.

It is contemplated in step 412 that the first stream can be produced upstream of the vessel using an acid gas removal system configured to receive a feed stream. In step 413, the acid gas removal system can comprise a FGD system, which produces the first stream substantially depleted of $SO_x$. However, depending upon the specific application any commercially suitable acid gas removal system could be used including, for example, caustic and chloride scrubbers.

In step 420, the first stream can be subsequently cooled by down-flow heat exchange with a first cooling fluid and then a second cooling fluid to produce a conditioned stream depleted of at least a portion of water condensed from the feed gas, although concurrent cooling with at least a portion of the first and second cooling fluids is also contemplated.

Preferably, in step 422, the vessel is configured such that at least one of the first and second cooling streams flows in a direction that is concurrent (e.g., downwardly) with respect to the first stream, and more preferably, in step 424 each of the first and second cooling streams flows in a direction that is concurrent with respect to the first stream. However, in alternative embodiments, it is contemplated that at least a portion of one or both of the first and second cooling streams could flow in a direction that is countercurrent with respect to the first stream.

It is especially preferred in step 430 that the second cooling stream has a temperature that is less than a temperature of the first cooling stream. Thus, in such configuration, the coolest stream is introduced at a lower portion of the vessel to thereby increase the efficiency of the heat transfer. In step 426, the first cooling stream can include at least some of the spent portion of the second cooling stream. In this manner, the cooling streams can be used more efficiently, which can reduce the number of external cooling streams required.

In step 440, a mist eliminator can be provided that is fluidly coupled to the vessel. In step 450, it is contemplated that at least a portion of the conditioned stream can be received in an absorber fluidly coupled downstream of the vessel. It is preferred that the absorber comprises a $CO_2$ capture system configured to produce a third stream substantially depleted of $CO_2$, although any commercially suitable absorber could be used depending upon the specific application.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A gas conditioning system configured for down-flow of a feed gas, comprising:
a housing having an inlet conduit disposed within an upper portion and configured to receive a first stream that is substantially depleted of $SO_x$;
first and second stages disposed within the housing, wherein the first stage is disposed upstream of the second stage and includes a first cooling stream, and wherein the second stage includes a second cooling stream that is colder than the first cooling stream;
wherein the first cooling stream comprises at least some of a spent portion of the second cooling stream and at least some of a spent portion of the first cooling stream; and
wherein the housing is configured such that the first stream is cooled by down-flow heat exchange with the first and second cooling streams to produce a cooled stream depleted of at least a portion of liquid condensed from the feed gas.

2. The system of claim 1, further comprising a mist eliminator fluidly coupled to the housing.

3. The system of claim 1, wherein the housing further comprises a lower portion and an outlet conduit disposed within the lower portion, and wherein the cooled stream that is substantially depleted of $SO_x$ exits the housing via the outlet conduit.

4. The system of claim 1, wherein the housing further comprises a lower portion and the first stage is disposed within the upper portion and the second stage is disposed within the lower portion.

5. The system of claim 1, further comprising a separation device disposed between the first and second stages.

6. The system of claim 1, wherein the at least some of the spent portion of the second cooling stream is cooled prior to joining the first cooling stream.

7. The system of claim 1, wherein the liquid comprises water.

8. The system of claim 1, wherein at least a portion of the liquid condensed from the gas is discharged from the system.

9. The system of claim 1, wherein the first cooling stream is drawn from the second stage to form a first cooling circuit and wherein the second cooling stream is drawn from a third stage to form a second cooling circuit.

10. The system of claim 1, further comprising an acid gas removal system fluidly coupled to the inlet conduit, and configured to receive the feed gas and produce the first stream.

11. The system of claim 10, wherein the acid gas removal system comprises a flue gas desulfurization system.

12. The system of claim 1, further comprising an outlet conduit in fluid communication with the housing and an absorber that is located downstream of the housing, wherein the absorber is configured to receive at least a portion of the cooled stream.

13. The system of claim 12, wherein the absorber comprises a $CO_2$ capture system configured to produce a third stream that is substantially depleted of $CO_2$.

14. A method of down-flow cooling of a feed gas, comprising:
receiving a first stream in an upper portion of a vessel that is substantially depleted of $SO_x$;
subsequently cooling the first stream by down-flow heat exchange with a first cooling fluid and a second cooling fluid to produce a conditioned stream depleted of at least a portion of liquid condensed from the feed gas;
wherein the first cooling fluid comprises at least some of a spent portion of the first cooling fluid; and
wherein the second cooling stream is colder than the first cooling stream.

15. The method of claim 14, further comprising providing a mist eliminator fluidly coupled to the vessel.

16. The method of claim 14, wherein a separation device is disposed beneath the upper portion.

17. The method of claim 14, wherein the liquid comprises water.

18. The method of claim 14, further comprising discharging at least some of the portion of the liquid condensed from the feed gas from the system.

19. The method of claim 14, producing the first stream using an acid gas removal system fluidly coupled upstream of the vessel, and configured to receive the feed gas.

20. The method of claim 19, wherein the acid gas removal system comprises a flue gas desulfurization system.

21. The method of claim 14, further comprising receiving at least a portion of the conditioned stream in an absorber fluidly coupled downstream of the vessel.

22. The method of claim 21, wherein the absorber comprises a $CO_2$ capture system configured to produce a third stream that is substantially depleted of $CO_2$.

23. The method of claim 14, wherein the first cooling stream comprises at least some of a spent portion of the second cooling stream.

24. The method of claim 23, further comprising cooling the at least some of the spent portion prior to the at least some of the spent portion joining the first cooling stream.

25. A gas conditioning system configured for down-flow of a feed gas, comprising:
a housing having an inlet conduit disposed within an upper portion and configured to receive a first stream from an acid gas removal system fluidly coupled to the inlet conduit;
first and second stages disposed within the housing, wherein the first stage is disposed upstream of the second stage and includes a first cooling stream, and wherein the second stage includes a second cooling stream that is colder than the first cooling stream;
a third stage disposed within the housing, wherein the third stage is disposed downstream of the second stage and includes a third cooling stream that is colder than the first cooling stream;
wherein the third cooling stream comprises at least one of a portion of a spent first cooling stream and a portion of a spent second cooling stream; and
wherein the housing is configured such that the first stream is cooled by down-flow heat exchange with the first, second and third cooling streams to produce a cooled stream depleted of at least a portion of liquid condensed from the first stream.

26. The system of claim 25, wherein the acid gas removal system comprises a flue gas desulfurization system, and wherein the first stream is substantially depleted of $SO_x$.

27. The system of claim 25, wherein the housing further comprises an outlet conduit, and wherein the cooled stream is substantially depleted of $SO_x$ and exits the housing via the outlet conduit.

28. The system of claim 25, wherein the first cooling stream comprises at least some of a spent portion of the second cooling stream.

* * * * *